(12) United States Patent
Forrest, Jr. et al.

(10) Patent No.: US 8,429,784 B2
(45) Date of Patent: Apr. 30, 2013

(54) COMPACT FIBER OPTIC COMPONENT CLEANING DEVICE AND METHOD

(75) Inventors: Edward J. Forrest, Jr., Marietta, GA (US); Paul M. Blair, Jonesboro, GA (US)

(73) Assignee: Illinois Tool Works Inc., Glenview, IL (US)

( * ) Notice: Subject to any disclaimer, the term of this patent is extended or adjusted under 35 U.S.C. 154(b) by 834 days.

(21) Appl. No.: 11/941,266

(22) Filed: Nov. 16, 2007

(65) Prior Publication Data
US 2009/0126138 A1  May 21, 2009

(51) Int. Cl.
*B08B 11/00* (2006.01)
(52) U.S. Cl.
USPC .............................. 15/210.1; 15/214; 15/231
(58) Field of Classification Search .................. 15/210.1, 15/104.93, 104.002; 206/494, 449, 554, 206/233; 283/101; 427/163.2, 393.4
See application file for complete search history.

(56) References Cited

U.S. PATENT DOCUMENTS

| | | | | |
|---|---|---|---|---|
| 579,850 | A | | 3/1897 | Uhlmann |
| 712,681 | A | * | 11/1902 | Huffman ........................ 462/61 |
| 1,848,859 | A | | 3/1932 | Wishart |
| 2,115,699 | A | | 6/1934 | Boyd |
| 2,585,061 | A | | 2/1952 | Webster, Jr. |
| 2,724,847 | A | * | 11/1955 | Krasno .................... 15/104.002 |
| 2,880,442 | A | | 4/1959 | Shelby |
| 3,613,146 | A | | 10/1971 | Oviatt |
| 3,785,930 | A | * | 1/1974 | Ellis ........................... 435/287.8 |

(Continued)

FOREIGN PATENT DOCUMENTS

| | | |
|---|---|---|
| AU | 527032 | 10/1983 |
| JP | 3459595 B2 | 1/2001 |

(Continued)

OTHER PUBLICATIONS

"A More Effective Means of Cleaning Fiber Optic Connections in Outside Plant, FTTH and OEM Applications", Ed Forrest, ITW Chemtronics, provided website link is www.chemtronics.com/pdf/upload/A%20More%20Effective%20Means%20of%20Cleaning%20-%20White%20Paper-3%20rev.pdf.

(Continued)

*Primary Examiner* — Monica Carter
*Assistant Examiner* — Stephanie N Berry
(74) *Attorney, Agent, or Firm* — Levenfeld Pearlstein, LLC

(57) ABSTRACT

A fiber optic component cleaning device includes a folder having a base, a cover and a separator. The cover and the separator are opposite one another relative to the base. The folder has a width. The base and cover have a fold therebetween such that the cover folds onto the base and the base and separator have a fold therebetween such that the separator folds onto the base. The base and cover have about an equal length and the separator has a length less than the length of the base and cover. A plurality of cleaner sheets are disposed in the folder. The cleaner sheets have a width that is about equal to or less than the width of the folder and have a length that is about equal to or less than the length of the base and cover. A top-most fresh cleaner sheet is separated from the plurality of cleaner sheets and is positioned on the separator sheet for cleaning the connector. When soiled, the soiled cleaner sheet is removed and discarded. A method for cleaning a fiber optic connector is also disclosed.

6 Claims, 1 Drawing Sheet

U.S. PATENT DOCUMENTS

| | | | |
|---|---|---|---|
| 4,101,026 A | | 7/1978 | Bonk |
| 4,152,803 A | | 5/1979 | Gersin et al. |
| 4,171,047 A | | 10/1979 | Doyle et al. |
| 4,306,687 A | | 12/1981 | Hadtke |
| 4,333,979 A | | 6/1982 | Sciaraffa et al. |
| 4,407,524 A | * | 10/1983 | Trautlein ............... 462/18 |
| 4,741,944 A | | 5/1988 | Jackson et al. |
| 4,746,574 A | * | 5/1988 | Hattori et al. ............ 428/409 |
| 4,873,728 A | | 10/1989 | Bono |
| 5,173,080 A | * | 12/1992 | Longtin ............... 462/2 |
| 5,186,684 A | * | 2/1993 | Weinberger ............ 462/17 |
| 5,220,703 A | | 6/1993 | Kanayama et al. |
| 5,605,749 A | | 2/1997 | Pike et al. |
| 5,656,361 A | | 8/1997 | Vogt et al. |
| 5,874,160 A | | 2/1999 | Keck |
| 5,922,427 A | * | 7/1999 | King ............... 428/40.1 |
| 6,098,239 A | | 8/2000 | Vosbikian |
| 6,865,770 B2 | | 3/2005 | Forrest |
| 6,975,803 B2 | | 12/2005 | Koide et al. |
| 2001/0055926 A1 | * | 12/2001 | Fereshtehkhou et al. ....... 442/96 |
| 2004/0245140 A1 | * | 12/2004 | Larsson et al. ............ 206/494 |
| 2006/0266670 A1 | * | 11/2006 | Forrest, Jr. ............ 206/494 |

FOREIGN PATENT DOCUMENTS

| | | |
|---|---|---|
| TW | 382992 | 8/2001 |
| WO | WO 98/03713 | 1/1998 |
| WO | WO 00/56201 | 9/2000 |

OTHER PUBLICATIONS

"Fiber Optic Cleaning—Fiber Connector Cleaner", Fiber Optics for Sale Co., Complete Supply Solutions, information regarding fiber optic cleaning and fiber connector cleaners, provided website link is www.fiberoptics4sale.com/Merchant2/fiber-optic-cleaning.php.

"The Combination Cleaning Process (CCp TM)" information regarding the combination cleaning process of ITW Chemtronics, provided website link is http://www.chemtronics.com/pdf/upload/The%20Combination%20Cleaning%20Process.pdf.

"Fiber Optic Connectors" by Force, Inc., 2005, Information regarding parts, installation and cleaning and handling of fiber optic connectors, provided website link is www.fiber-optics.info/articles/connector-care.htm.

"Fiber Optic Cleaning Practices", Avici Systems, Inc., 2006, provided website link is avici.com/documentation/PDFDocs/06698-00_revAA.pdf.

\* cited by examiner

COMPACT FIBER OPTIC COMPONENT CLEANING DEVICE AND METHOD

BACKGROUND OF THE INVENTION

The present invention is directed to a fiber optic component cleaning device. More particularly, the present invention pertains to a compact and easily carried and stored fiber optic component cleaning device having a self-contained work surface.

Fiber optics have become a favored medium for network transmission. Using fiber optics, transmission rates have increased to a contemporary standard of ten gigabytes per second and are expected to increase. It is believed that transmission rates will reach forty gigabytes per second, and work continues to achieve transmission rates on the order of petabytes and terabytes per second.

In order to support achieving and surpassing these transmission rates, the transmission media must be fabricated and maintained to exacting standards and tolerances. It has been found that during fabrication, manufacturing, construction, installation and maintenance, fiber optic component end faces can become contaminated with dirt, dust, oil, grease, and other debris.

Cleaning these end faces preserves the accuracy of high-speed transmissions. Moreover, the end faces of the conductors must be free of scratches, burrs, and the like to maintain the standards necessary for these high transmission rates. The same standards of cleanliness are equally essential for installation, maintenance and test procedures.

Devices are known for cleaning fiber optic end faces. These devices have been met with differing degrees of success. For example, one known device, disclosed in Forrest, U.S. Pat. No. 6,865,770, which patent is commonly owned with the present application and is incorporated herein by reference, includes a container in which is stored a roll of wipers. A cleaning platen is mounted on a side of the container on which the connectors are held during cleaning. While this device is extremely successful, it can be cumbersome to carry to, for example, a job site. Moreover, the device can store a large number of wipes in that it can be used over a long period of time. The device, however, presents logistical concerns when shipping with other equipment as an integral part of a clean and test operation. In addition, the size of the device precludes including the device in connection equipment, panels and the like.

Other devices use multi-part cleaning kits and the like. However, these kits may be to large to bring to and from a job site, and too large and difficult to use.

It is also critical to minimize and/or avoiding generating lint in that fibrous material can obstruct an end face which may cause loss of laser light transmission. Accordingly, paper products and other flaking materials are discouraged because they can generate lint. In addition, paper products generally cannot be used with a wet-cleaning technique. Wetting paper cleaning products causes them to shred, exacerbating the linting problem. Nevertheless, it is most effective to use a wet cleaning method. Another, "combination" method has come into use in which the connector face is drawn from a wet area (to effectively clean the face) to a dry area. Such a method has been found to provide the advantages of both wet and dry cleaning in one operation and has earned significant recognition in the industry.

It has also been found that whatever cleaning method is used, it is advantageous to have a backing or surface on which the connector is held to clean the connector. It is most beneficial that the surface have some give or resiliency for best results. possibility of scratching. However, known cleaning devices (or kits) require the use of a dry wipe or towel with a separate solvent spray or other application.

Accordingly, there is a need for a compact fiber optic cleaning device. Such a device is easily stored in a tool box or a user's pocket. Desirably, such a device includes multiple cleaners to permit multiple uses. More desirably, such a device permits separating fresh cleaners from used cleaners to prevent contamination of the fresh cleaner. Most desirably, such a device includes a cleaning surface and can be used for dry, wet or combination cleaning operations.

BRIEF SUMMARY OF THE INVENTION

A fiber optic component cleaning device includes a folder having a base, a cover and a separator. The cover and the separator are opposite one another relative to the base. The folder has a width.

The base and cover have a fold therebetween such that the cover folds onto the base and the base and separator have a fold therebetween such that the separator folds onto the base. The base and cover have about an equal length and the separator has a length less than the length of the base and cover. The separator length is about ½ to ¾ of the base and cover length.

A plurality of cleaner sheets are disposed in the folder. The cleaner sheets have a width that is about equal to or less than the width of the folder and a length that is about equal to or less than the length of the base and cover. In this manner, the cleaner sheets fit within the footprint of the base when the cover and separator are folded over onto the base and the sheets.

A top-most fresh cleaner sheet is separated from the plurality of cleaner sheets and is positioned on the separator sheet for cleaning. When soiled, the soiled cleaner sheet is removed and discarded to prevent accidental reuse and/or contamination of unused (fresh) sheets.

The sheets can be affixed to the folder at about the fold between the base and the cover. A present device includes about 4 to as many as 20 or more cleaner sheets. The sheets are formed from a non-woven material. Preferably, the sheets are formed from a synthetic or synthetic blend (e.g., synthetic/cellulose) material and more preferably, a water resistant material.

The folder is preferably formed from a non-degrading material. The folder material can be a polymeric material or it can be a coated material. The folder material and/or coating can be an electrostatic dissipative material.

A method for cleaning a fiber optic connector includes providing a fiber optic component cleaning device, separating a top-most fresh cleaner sheet from a plurality of cleaner sheets in the device, positioning the top-most fresh cleaner sheet on a separator sheet of the device, cleaning the fiber optic connector producing a soiled cleaner sheet which is removed and discarded to prevent accidental reuse and/or contamination of unused (fresh) sheets.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
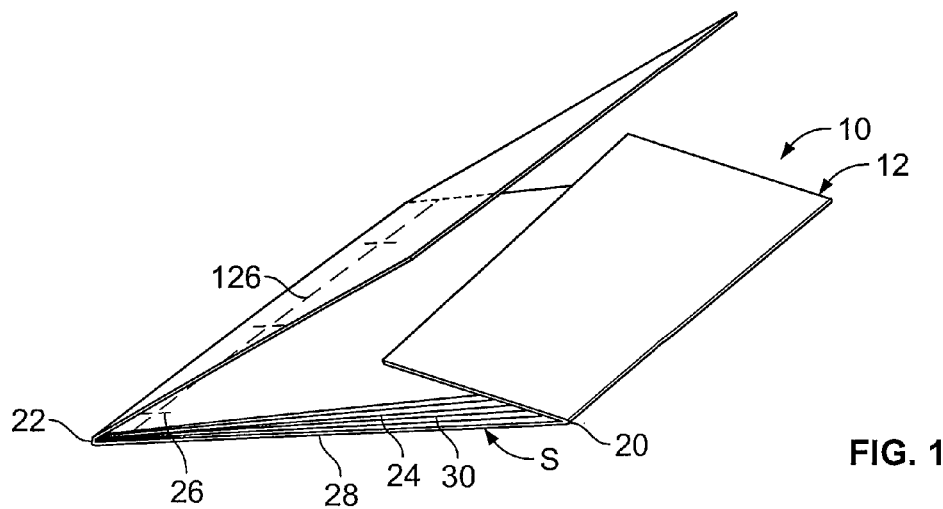
FIG. 1 is a perspective view of a compact fiber optic cleaning device embodying the principles of the present invention.
Figure 2:
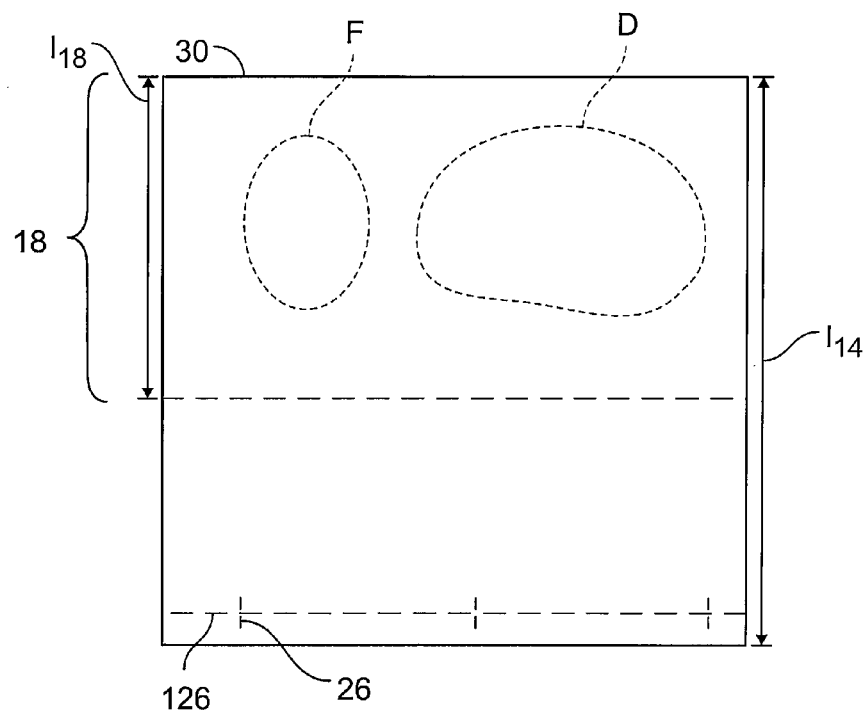
FIG. 2 is a top view of the cleaning device.
Figure 3:
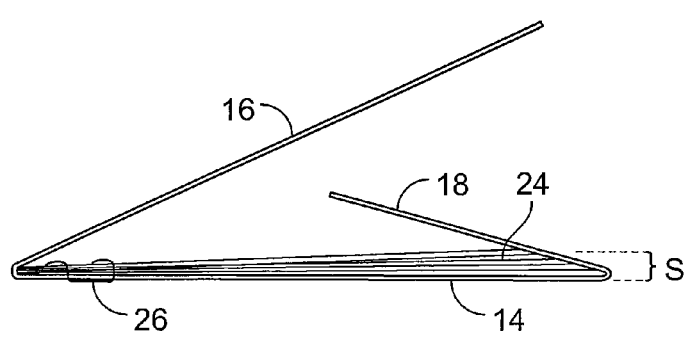
FIG. 3 is a side view of the cleaning device.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular to FIG. 1 there is shown one embodiment of a fiber optic component cleaning device 10 in accordance with the principles of the present invention. The cleaning device 10 is formed as a folder 12 having a base 14, a cover 16 that is folded up from one end of the base 14, and a separator or work platen 18 that is folded up from the opposite end of the base 14. The cover 16 is a full length or substantially full length element and the separator or work platen 18 is a partial length element. In a present cleaning device 10, the separator 18 has a length $l_{18}$ extends more than ½ of the length $l_{14}$ of the base 14.

For purposes of the present disclosure, the folder 12 portion having the fold 20 between the base 14 and the separator 18 will be referred to as the top of the device 10 and the folder 12 portion having the fold 22 between the base 14 and the cover 16 will be referred to as the bottom of the device 10.

A plurality of cleaner sheets 24 are disposed in the folder 12. The sheets 24 can be affixed to the folder 12, such as by ultrasonic welding as indicated at 126 or by staples 26, at the fold 22 between the base 14 and the cover 16. In this manner, the sheets 24 "open" or separate from each other at the top or at the fold 20 between the base 14 and separator 18. The folder is formed from a silica-base synthetic microporous printing sheet commercially available under the trademark TESLIN® available from PPG Industries of Pittsburgh, Pa. This material was selected for its chemical and water resistance, tear strength, general toughness and subtle cushioning effect. Alternatively, a coated paperboard material can also be used. In a present cleaning device, 2 to 20 (or perhaps more, depending upon the nature of the cleaning operation and application) sheets 24 are affixed to the folder 12, and preferably about 4 to 10 sheets 24 are in the folder 12. The sheets 24 are sized so as to extend about to the fold 20 and lie within the footprint (as indicated at 28) of the base 14. It will be appreciated that the sheets can be affixed to one another and/or the folder by ultrasonic welding (as at 126 in FIG. 1) or by an adhesive, and that such configurations is within the scope and spirit of the present invention. Any adhesive of course will be compatible with the cleaning liquids, as well as the sheet 24 and folder 12 materials, as well being suitable for the desired use.

In a present device, the cleaner sheets 24 are formed from a non-woven, absorbent material. A present material is a non-woven, hydro-entangled polyester/cellulose blend, such as that commercially available under the trademark SONTARA® from E.I. DuPont of Wilmington, Del. This material was found to be quite suitable for the present cleaning device application due to its ability to absorb soils and solvents and water. In addition, because it is a non-woven material, it is highly non-linting which is an utmost consideration for fiber optic cleaning purposes. The folder 12 can be formed from an electrostatic dissipative (ESD) material or coated with an ESD material.

In use, the cover 16 is opened and a single cleaning sheet 24 is separated from the stack S of sheets. The separator 18 is closed or folded onto the remaining sheets in the stack S and the single sheet 24 is place on the separator 18. A small amount of a solvent cleaning fluid F, such as ELECTRO-WASH® MX brand cleaner (from a pen or bulk), commercially available from ITW Chemtronics or Kennesaw, Ga., is dropped or absorbed into the upper portion 30 of the cleaning sheet 24 (which is that portion that overlies the separator 18). The separator 18, of course, prevents the solvent F from being absorbed into the stack of sheets S below the separator 18.

The end face of the connector is then drawn across the cleaner sheet 24 from the wet area (as at F) to a dry area (as at D; wet-to-dry cleaning) on the cleaning sheet 24. It is anticipated that drawing the connector along the sheet 24 is carried out about (and preferably) three times to provide effective cleaning of the connector end face. This "combination" method has been found to be very effective and affords the advantages of both wet and dry cleaning in one operation. It will, of course, be appreciated that the present device 10 can be used for dry or wet cleaning as well.

After the end face has been cleaned, the used cleaning sheet is then removed by tearing along the ultrasonic bond or pulling from the staples. The used (and solvent saturated) sheet is then discarded to prevent accidental reuse and/or contamination of unused or fresh sheets in the stack S.

In an alternate cleaning operation in which pre-saturated sheets (not shown) are used in lieu of the liquid solvent cleaner, after the separator 18 is placed on the fresh stack of sheets S and the cleaning sheet 24 to be used is placed on the separator 18, the pre-saturated or pre-wetted sheet is placed under the cleaner sheet 24, between the cleaner sheet 24 and the separator 18 (on top of the separator 18) and the liquid is allowed to wick into the cleaning sheet 24. The process of cleaning and discarding the used wipes or sheets is the same.

While the present device 10 is shown with a full length cover 16 and a partial length separator sheet 18 and with cleaning sheets 24 affixed at the cover fold 22, other configurations for the cleaning device 10 will be appreciated by those skilled in the art and such other configurations are within the scope and spirit of the present invention. It is also anticipated that graphics or the like can be included on the folder 12 to provide instructions, logos, advertisements and the like.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fiber optic component cleaning device, comprising:
a tri-fold folder having a base, a cover, and a separator, the cover and the separator being opposite one another relative to the base, the folder being formed of a water resistant material coated with an electrostatic dissipative material that has a width and a cushioning effect, the base and cover having a fold therebetween such that the cover folds onto the base, the base and separator having a fold therebetween such that the separator folds onto the base, the base and cover having about an equal length and the separator having a length less than the length of the base and cover to permit folding the separator between the cover and base; and a plurality of cleaner sheets disposed in the folder, the cleaner sheets having a width that is about equal to or less than the width of the folder and having a length that is about equal to or less than the length of the base and cover, the cleaner sheets being formed from a non-woven, synthetic material and being affixed to the folder at about the fold between the base and the cover, wherein a top-most fresh cleaner sheet is separated from the plurality of cleaner sheets and is positioned on the separator sheet for cleaning and when soiled, the soiled cleaner sheet is removed from the folder and discarded, and wherein when folded, the tri-fold folder has a substantially flat profile.

2. The fiber optic component cleaning device in accordance with claim 1 wherein the separator has a length about ½ to ¾ of the length of the base.

3. The fiber optic component cleaning device in accordance with claim 1 including about 4 to 10 cleaner sheets.

4. The fiber optic component cleaning device in accordance with claim 1 wherein the non-woven, synthetic material is a cellulose blend.

5. The fiber optic component cleaning device in accordance with claim 1 wherein the folder is formed from a polymeric material.

6. The fiber optic component cleaning device in accordance with claim 1 wherein the folder is formed from a coated material.

* * * * *